United States Patent [19]

Meyer et al.

[11] Patent Number: 4,497,595
[45] Date of Patent: Feb. 5, 1985

[54] METHOD OF BONDING ROOFBOLT RODS TO BOLTHOLES

[75] Inventors: Frank Meyer; Wolfgang Cornely; Hans Mehesch, all of Essen, Fed. Rep. of Germany

[73] Assignee: Bergwerksverband GmbH, Essen, Fed. Rep. of Germany

[21] Appl. No.: 456,757

[22] Filed: Jan. 10, 1983

[30] Foreign Application Priority Data

Jan. 12, 1982 [DE] Fed. Rep. of Germany ....... 3200574

[51] Int. Cl.$^3$ ...................... E21D 20/02; E21D 21/00
[52] U.S. Cl. ...................................... 405/261; 405/260
[58] Field of Search ....................... 405/261, 260, 263; 166/295, 274, 275; 252/8.55

[56] References Cited

U.S. PATENT DOCUMENTS

| | | | |
|---|---|---|---|
| 2,867,278 | 1/1959 | Mallory et al. | 166/295 |
| 2,889,883 | 6/1959 | Santora | 166/295 |
| 3,925,996 | 12/1975 | Wiggill | 405/261 |
| 4,353,463 | 10/1982 | Seemann | 405/259 X |
| 4,386,877 | 6/1983 | McDowell | 405/261 |

Primary Examiner—Dennis L. Taylor
Attorney, Agent, or Firm—Michael J. Striker

[57] ABSTRACT

A procedure of bonding roofbolt rods to boltholes whereby the roofbolt rod is pushed under rotating movements into a bolthole filled with an adhesive mass consisting of a mix by whose reaction is obtained polyurethane, characterized in that a mass consisting of polyisocyanate-prepolymerides is used which has been prepared from polyisocynates and one or more bifunctional polyols in a molecular weight range between 800 and 5,000, preferably between 1,200 and 3,000, and which reacts in the borehole with 1 to 25% by weight (related to the mass) of water and/or polyols serving as the hydroxyl component.

11 Claims, No Drawings

METHOD OF BONDING ROOFBOLT RODS TO BOLTHOLES

BACKGROUND OF THE INVENTION

The invention refers to a method of bonding roofbolt rods to boltholes.

It is a common practice to use unsaturated polyester resins and polyurethanes as reactive resin mass for bonding boltrods in boltholes. For this purpose, the two components polyisocyanate and polyol which form the polyurethane are filled separately in two compartments of a cartridge which may consist e.g. either of a synthetic foil or an extruded brittle mass (please refer to DE-PS No. 26 41 776). When introducing the bolt into the bolthole by a rotating movement, the compartments will be destroyed, so that the two components mix and react, forming polyurethanes. According to DE-AS No. 12 05 038 and DE-AS No. 17 84 458, the polyurethane resin will gel no earlier than after 2 hours and harden after 5 to 6 hours. For practical reasons, however, much shorter gelling and hardening times are required, since the bolt rod in upwardly oriented boltholes must be secured against sliding prior to attaining the gelling point and the roofbolt, particularly in tunneling and mining applications, must as early as possible attain load-bearing properties.

In the disclosure of DE-AS No. 27 05 751 there is described a system avoiding such drawback, by using polyols containing tertiary amino groups as hydroxyl components, which at the same time act as catalysts, so that gelling and hardening durations of less than 1 minute are achieved. According to claim 3 of the above disclosure, however, the admixture of water is limited to 0.5% by weight, related to polyol. In the case of more substantial water volumes, e.g. in damp boreholes, the mix will foam so much that the ultimately hardened foam is not capable of sustaining any sizable tractive forces.

A copending application Ser. No. 454,479 filed by the same inventor on Dec. 29, 1982 also discloses a method of bonding roofbolt rods to boltholes.

SUMMARY OF THE INVENTION

The objective of the present invention is to render possible the use of polyurethane-based adhesives for roofbolts by a procedure according to the concept described above, also in wet boltholes and with, at the same time, short gelling and hardening periods.

The objective is met by the present invention in that, instead of the polyisocyanate component, there is used a prepolymeride prepared from polyisocyanates and from one or several bifunctional polyols of a molecular weight range between 800 and 5,000, preferably between 1,200 and 3,000, and that the above material reacts in the bolthole with 1 to 25% by weight water and/or polyols serving as hydroxyl component.

In the document DE-OS No. 24 48 958 has already been pointed out the hazard of water possibly preventing geological formations from being efficiently sealed by polyurethane systems; besides prepolymerides from toluylene-di-isocyanate and mixes from diphenyl-methane-di-isocyanate with its isomers and higher-molecular components, i.e. with crude MDI as isocyanate component and hydroxyl components of the molecular weight range between 400 and 600, there has also been recommended the admixture of metal-organic compositions and foam stabilizers acting as accelerators. With the above method, reactive resins are pressed directly into the geological formations, so that one does not meet the objective of effectively bonding roofbolts rods to boltholes. Prepolymerides from toluylene-diisocyanate are practically excluded anyway for reasons of toxicity. There are no indications given in the above DE-OS as to the manufacturing of prepolymerides suited for bonding bolt rods.

The essential advantage of the procedure according to the present invention consists in that water may, in its entire volume or partially, serve as hydroxyl component, so that excellent adhesion of the roofbolt rods is ensured even in damp boltholes. Unlike this, the two-compartment cartridges filled with polyester resins and hardeners fail in such situation, although they have so far attained optimal adhesive properties in dry boltholes.

For technical reasons and those of occupational hygiene, dry drilling has, for some time now, been replaced by wet drilling methods, with simultaneous water flushing of the borehole bottom, so that cartridges filled with polyester resins are hardly anymore usable, all the more so as they contain bigger volumes of health-affecting styrene.

Another advantage of using water or aqueous solutions as hydroxyl component is that the resin will only slightly foam up in the course of the polyurethane-forming reaction, and any excessive foaming action is prevented thanks to the prepolymeride serving as isocyanate component. Due to the resulting volume expansion will be achieved an improved bonding between resin and bolthole, which is of critical importance, especially in case of deflected boltholes and in fractured rock.

As polyisocyanate component for preparing the prepolymerides may be considered the crude polyisocyanates, liquids at room temperature, which are common in polyurethane chemistry and are manufactured by aniline/formaldehyde condensation with subsequent phosgenization. Furthermore appropriate are the modified products of such polyisocyanate mixes of the isocyanate series, e.g. any derivatives thereof containing carbodiimide groups, biurate groups, urethane groups, or allophanate groups. Such polyisocyanates have been described e.g. by Ullmann, Verlag Chemie, 4th edition, vol. 19, pp. 303–305.

Particularly suitable are the polyisocyanate mixes, liquid at room temperatures and having been obtained by the phosgenization of aniline-formaldehyde condensation of an average functionality between 2.1 and 3.5, preferably between 2.2 and 2.9,—mixes which mainly consist of isomeric di-isocyanate diphenyl-methanes and oligomeric homologs ("MDI") thereof, since these isocyanates are of an average functionality between 2.1 and 3.5, preferably between 2.2 and 2.8, and a functionality within this range is desirable in the interest of a good netting with the linear polyols.

The polyols used for manufacturing the prepolymerides are bifunctional polyols having average molecular weights between 800 and 5,000, preferably between 1,600 and 3,000, i.e. longchain bifunctional polyols. This corresponds to an OH number between 140 and 22 or preferably to an OH range between 70 and 37. One may consider the polyether-polyols of propylene oxide, ethylene oxide, or of mixed propylene oxide/ethylene-oxide, whose polymerization was initiated either by water or by a low-molecular diol, e.g. ethylene-glycol, propane 1,2-diol, propane-1,3-dioleine or butane-1,4- dioleine. Said polyisocyanates and polyether-polyols are prepolymerized according to basically known processes (see Vieweg-Höchtlen, Manual on Synthetics, VIII, p. 447 ff.) to give prepolymerides of polyisocyanate. Polyisocyanates should be used in a strongly excessive proportion over polyether-polyols, in order to keep the viscosity of the resulting polyisocyanate-prepolymerides within the limits of handlability. It is purposeful to keep the viscosity of the polyisocyanate-prepolymerides below 50,000 m Pa. s, preferably below 10,000 m Pa. s. If tri- and higher-functional polyols are added, e.g. in volumes of more than 10% by weight, the viscosity would rise to such high levels that a two-compartment cartridge would not be of any use.

Particularly suitable as hydroxyl components for the reactive resin mass as per the present invention are polyols of OH numbers between 250 and 2,000, preferably between 1,000 and 1,850. They cause a rapid and consistent hardening of the resin. Particularly appropriate are short-chained polyols, e.g. ethylene-glycol, diethylene-glycol, triethylene-glycol, glycerine, propane-1,2-diol, propane-1,3-diol, and butane-1,4-dioleine. If dissolved in the above polyols or in water, solid polyols—e.g. penta-erythrite, sorbite, mannite, fructose, galactose, cane-sugar, molasses, starch, hydroxyethyl-cellulose, polyvinyl-alcohol—may serve as hydroxyl component as well. Water alone may also be considered as hydroxyl component.

According to the procedure as per the invention, the prepolymeride and/or the hydroxyl components may either contain a tertiary amine or the hydroxyl components may represent a polyol containing amino groups.

Of excellent suitability are e.g. polyols containing one or several amino groups. As examples for such polyols are to be mentioned tri-ethanolamine, biethanolamine, alcoxylation products of ammonia, triethanolamine, or ethylene-diamine with epoxides, e.g. ethylene oxide and propylene oxide.

Among suitable tertiary amines should be mentioned N,N-dimethyl-cyclohexylamine, triethylamine, dimethyl-ethanolamine, tributylamine, diazobicyclo-(2,2,2)-octane, N-methylmorpholine, N,N,N',N'-tetramethyl-ethylene-diamine. It is purposeful to add those amines in proportions between 0.2 and 5%.

According to the procedure as per the invention, one or either of the two components may also contain a metallo-organic composition serving as a catalyst for the polyurethane reaction.

Among the suitable metallo-organic compositions should be mentioned: the salts of organic acids plus metals of groups IIb and IVb of the periodical system as well as transitional metals, in particular compositions of tin, e.g. tin dilaurate, tin diethyl-hexoate, tin dinaphthenate, tin distearate, dibutyl-tin-dilaurate, dimethyl-tin-dilaurate, dioctyl-tin-distearate, dibutyl-tin-distearate and other compounds of the general formula $Sn(OOC-R)_2$ and $R'_2Sn(OOCR)_2$, wherein R and R' stand for aliphatic residues. It would be purposeful to add, in general, between 0 and 2% by weight of these compounds to the reactive resinous mass.

To improve the adhesive properties of the dowel or of the bolt rod it is recommended to add filling agents either to the hydroxyl component and/or to the prepolymeride component. Among these basically known filling agents may be considered e.g. ground limestone, quartz powder, heavy spar or glass fibers. Filling agents may be added in proportions between 10 and 80% by weight, preferably between 20 and 70% by weight, based on the total resinous mass.

Due to the short gelling and hardening times of the blended components, it is possible and also purposeful to use automatic bolthole drilling- and -setting equipment for introducing the roofbolts.

For similar reasons a cartridge according to the present invention is also especially suitable for upwardly oriented boltholes, since the resin coming out of the destroyed cartridge can no longer leak out of the bolthole. Both hazards to workmen as well as material losses are avoided.

It is purposeful to apply the hydroxyl component onto the wall of the borehole either via the borehole flushing or by some other liquid supply system. The isocyanate-prepolymeride component—under the form of a "single-component cartridge" whose contents consist exclusively of prepolymerides which on reacting with water and/or polyols will yield polyurethane—is subsequently introduced or by means of an appropriate device pushed or otherwise inserted in the borehole. It is, however, also possible to introduce both a cartridge containing a prepolymeride as well as one containing water or any other hydroxyl component.

Both the components may be pushed into the borehole jointly as well; in this case it is recommended to add a thixotropic agent preventing the resinous mass from leaking out of the bolthole.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

EXAMPLE 1

At a constant temperature of 40° C., 500 g of a polypropylene-glycol based on propane-1,2-diol of OH number 58 and of an average molecular weight of 2,000 are added drop by drop and gas-shielded to 1,000 g of a polyisocyanate based on aniline-formaldehyde condensates of 220 m Pa. s viscosity and a NCO content of 31%, with subsequent stirring for 12 hours at 60° C. The thereby manufactured prepolymeride has a NCO content of 19% and a viscosity of 2,450 m Pa. s.

100 g of the above prepolymeride are filled into a cartridge manufactured from a 0.1 mm thick polyamide foil. The cartridge is 26 cm long and has a diameter of 24 mm.

After introduction in a wet borehole of 28 mm diameter and 2 m length, the above cartridge is destroyed by a bolt rod being inserted by rotating movements. Gelling time of the resin obtained from the component blend (prepolymeride and water): 12 min. After 24 hours the bolt rod can be withdrawn from the bolthole only on applying a tractive force of 20 tons. For comparison, the cartridge is filled with a prepolymeride which had been manufactured by polyaddition of 1,000 g of the above polyisocyanate with 500 g of polypropylene-glycol of OH number 260 viz of 470 average molecular weight. Such prepolymeride contains 12.9% of NCO and has a viscosity of 900,000 m Pa. s.

100 g of this prepolymeride are filled in the said cartridge and used, as described in the foregoing paragraph, for bonding of roofbolt rod to a wet bolthole. Gelling time of the resin: 10 minutes. After 24 hours the bolt rod can be withdrawn from the borehole on applying a tractive force of as low as 5 t.

For comparison with the procedure according to DE-PS No. 27 05 751, the cartridge is filled with 100 g of the above polyisocyanate and the bolthole pre-flushed with 100 g of a polyol of OH number 640 and 310 average molecular weight, obtained from ethylene-diamine and propylene oxide, together with 0.5 parts by weight of water. The gelling time of the resin having formed in the wet borehole is 1 minute. After 24 hours, the bolt rod can be withdrawn from the hole on applying a tractive force of as low as 4.5 t.

EXAMPLE 2

According to Example 1, a bolthole of 2 m depth and 28 mm diameter is produced by wet drilling. Subsequently a 50% glycerine/water mix is injected into the upwardly oriented bolthole. Then 90 g prepolymeride of 10,000 Pa. s viscosity, blended with 45 g quartz powder and 2 m triethyleneamine, are pressed into the bolthole, after which the rod is inserted.

The gelling time is 50 s.

After 24 h and on applying a tractive force of 24 t, the rod breaks.

EXAMPLE 3

A bolthole of 28 mm diameter and 2 m depth is wet-drilled using an automatic roofbolt setting equipment. The bolthole is then filled, using a dual-component injection equipment, with 150 g prepolymeride blended with quartz powder, according to Example 2, and with 40 g of 70% molasses to which had been added 5 g triethylene-diamine and 0.5 g of a dibutyl-tin-dilaurate-based catalyst. Then the bolt rod is introduced in the borehole according to Example 1.

The gelling time is 45 s.

After 24 h the rod can be withdrawn from the hole by applying a tractive force of 28 t.

EXAMPLE 4

A glass cartridge of 24 mm diameter and a length of 26 cm is filled with 150 g of a prepolymeride according to Example 1. Both ends of the cartridge are plugged.

According to Example 1, the cartridge is introduced into a wet borehole which has been pre-flushed with a 15% watery glycerine containing 15% by weight of triethanol-amine. Then the bolt rod is inserted by rotating movements, destroying the cartridge, whose content mixes with the solution adhering to the wall of the borehole.

The gelling time is 50 s.

After 24 h the rod can be withdrawn from the hole on applying 26 tons of tractive force.

EXAMPLE 5

A watery solution of glycerine in which the dissolved 2% of dibutyl-tin-dilaurate, is injected into a dry-drilled bolthole of 28 mm diameter and 2 m length. Then the cartridge is inserted according to Example 4 and the bolt rod introduced by rotating movements, causing the contents of the cartridge to blend with the solution in the borehole.

The gelling time is 70 s.

After 24 h the bolt rod can be withdrawn from the hole on applying a tractive force of 20 t.

It will be understood that each of the elements described above, or two or more together, may also find a useful application in other types of resin production differing from the types described above.

While the invention has been illustrated and described as embodied in a method of bonding roofbolt rods to boltholes, it is not intended to be limited to the details described, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method of bonding roofbolt rods to boltholes of the type in which the roofbolt rod is pushed under rotating movements into a bolthole filled with an adhesive mass comprising a mix by whose reaction is obtained polyurethane, the improvement comprising using a mass comprised of polyisocyanate-prepolymerides which has been prepared from polyisocyanates and one or more polypropylene-glycols in a molecular weight range between 800 and 5,000, and mixing said means in the bolthole with 1 to 25% by weight (related to the mass) of water and/or polyols serving as the hydroxyl component.

2. Method as defined in claim 1, wherein said molecular weight range is between 1,200 and 3,000.

3. Method as defined in claim 1, wherein the polyisocyanate component comprises phosgenization products from aniline-formaldehyde condensates of an average functionality between 2.1 and 3.5.

4. Method as defined in claim 3, wherein said average functionality is between 2.2 and 2.8.

5. Method as defined in claim 1, wherein the hydroxyl component is constituted of polyols having OH numbers between 250 and 2,000.

6. Method as defined in claim 5, wherein the hydroxyl component is constituted by polyols having OH numbers between 1000 and 1,850.

7. Method as defined in claim 1, wherein aqueous solutions of solid or liquid polyols serve as hydroxyl component.

8. Method as defined in claim 1, wherein either one of the two components contains a tertiary amine, or the hydroxyl component is a polyol containing amino groups.

9. Method as defined in claim 1, wherein one of the two components contains an organo-metallic combination serving as a catalyst for the polyurethane reaction.

10. Method as defined in claim 1, wherein filling agents have been added to the prepolymeride component.

11. Cartridge for implementing the method according to claim 1, characterized in that the cartridge contents consist exclusively of propolymerides by whose reaction with water and/or polyols polyurethane will be obtained.

* * * * *